US012433401B2

(12) United States Patent
Markovski et al.

(10) Patent No.: US 12,433,401 B2
(45) Date of Patent: Oct. 7, 2025

(54) JOINING SYSTEM FOR FURNITURE

(71) Applicant: VILOX SYSTEMS AB, Helsingborg (SE)

(72) Inventors: Bobby Markovski, Helsingborg (SE); Magnus Persson, Helsingborg (SE)

(73) Assignee: VILOX SYSTEMS AB, Helsingborg (SE)

( * ) Notice: Subject to any disclaimer, the term of this patent is extended or adjusted under 35 U.S.C. 154(b) by 390 days.

(21) Appl. No.: 17/785,296

(22) PCT Filed: Dec. 10, 2020

(86) PCT No.: PCT/SE2020/051192
§ 371 (c)(1),
(2) Date: Jun. 14, 2022

(87) PCT Pub. No.: WO2021/126048
PCT Pub. Date: Jun. 24, 2021

(65) Prior Publication Data
US 2023/0346120 A1 Nov. 2, 2023

(30) Foreign Application Priority Data
Dec. 18, 2019 (SE) .................................... 1951500-6

(51) Int. Cl.
*A47B 47/04* (2006.01)
*A47B 96/20* (2006.01)
(Continued)

(52) U.S. Cl.
CPC ............ *A47B 47/042* (2013.01); *A47B 96/20* (2013.01); *B27C 5/02* (2013.01); *F16B 12/46* (2013.01);
(Continued)

(58) Field of Classification Search
CPC . A47B 47/042; A47B 96/20; A47B 2210/092; A47B 2230/0096;
(Continued)

(56) References Cited

U.S. PATENT DOCUMENTS 671,954 A * 4/1901 Eaton
2,496,184 A 1/1950 Von Canon
(Continued)

FOREIGN PATENT DOCUMENTS

AU 2014200573 A1 4/2014
BE 1019989 A3 3/2013
(Continued)

OTHER PUBLICATIONS

WIPO; App No. PCT/SE2020/051192; International Preliminary Report on Patentability mailed Feb. 24, 2022.
(Continued)

*Primary Examiner* — James O Hansen
(74) *Attorney, Agent, or Firm* — Fitch, Even, Tabin & Flannery LLP

(57) ABSTRACT

A joining system for furniture is provided. The joining system comprises a first furniture element and a joining element. The joining element has a width between a first and a second surface in the area of the second engaging portion. An increase in the width causes a first engaging portion to press harder on a first stabilizing portion which causes a male coupling portion to bend in a direction towards the surface comprising the second stabilizing portion to compensate for the increased width.

17 Claims, 5 Drawing Sheets

(51) Int. Cl.
 *B27C 5/02* (2006.01)
 *F16B 12/46* (2006.01)
(52) U.S. Cl.
 CPC . *A47B 2210/092* (2013.01); *A47B 2230/0096* (2013.01); *A47B 2230/06* (2013.01); *F16B 2012/463* (2013.01)
(58) Field of Classification Search
 CPC ............... A47B 2230/06; F16B 12/46; F16B 2012/463; B27C 5/02
 See application file for complete search history.

(56) References Cited

U.S. PATENT DOCUMENTS

| | | | |
|---|---|---|---|
| 6,006,486 | A | 12/1999 | Moriau et al. |
| 6,413,007 | B1 | 7/2002 | Lambright |
| 6,438,919 | B1 | 8/2002 | Knauseder |
| 6,804,926 | B1 | 10/2004 | Eisermann |
| 7,818,939 | B2 * | 10/2010 | Bearinger ............... F16B 12/26 403/381 |
| 9,826,828 | B1 * | 11/2017 | Vaughan, Jr. ........... F16B 12/46 |
| 2002/0108343 | A1 | 8/2002 | Knauseder |
| 2008/0295438 | A1 | 12/2008 | Knauseder |
| 2012/0279161 | A1 | 11/2012 | Hakansson |
| 2013/0071172 | A1 | 3/2013 | Maertens et al. |
| 2015/0078819 | A1 * | 3/2015 | Derelov ............... A47B 47/042 403/375 |
| 2017/0227035 | A1 * | 8/2017 | Fridlund ............... A47B 96/201 |
| 2019/0145108 | A1 | 5/2019 | Hannig et al. |
| 2019/0246796 | A1 | 8/2019 | Eriksson et al. |
| 2019/0323535 | A1 * | 10/2019 | Derelöv ............... A47B 96/201 |
| 2022/0299058 | A1 | 9/2022 | Maertens |

FOREIGN PATENT DOCUMENTS

| | | |
|---|---|---|
| CA | 3027843 A1 | 1/2018 |
| CA | 3163335 A1 | 5/2022 |
| CN | 1451072 A | 10/2003 |
| CN | 1756881 A | 4/2006 |
| CN | 102917616 A | 2/2013 |
| CN | 103477004 A | 12/2013 |
| CN | 107075858 A | 8/2017 |
| CN | 107874474 A | 4/2018 |
| CN | 108496013 A | 9/2018 |
| CN | 110573685 A | 12/2019 |
| CN | 1383464 A | 12/2022 |
| CN | 115867171 A | 3/2023 |
| DE | 29710175 U1 | 8/1997 |
| DE | 202006004932 U1 | 8/2007 |
| DE | 202013010931 U1 | 3/2014 |
| EP | 1671562 A1 | 6/2006 |
| EP | 2333353 A2 | 6/2011 |
| WO | 2011151737 A2 | 12/2011 |
| WO | 2013001442 A1 | 1/2013 |
| WO | 2018004418 A1 | 1/2018 |

OTHER PUBLICATIONS

WIPO; App No. PCT/SE2020/051192; International Search Report and Written Opinion mailed Jan. 19, 2021.
EPO; Search report and opinion from EP Application No. 20902740.8; Jan. 9, 2024 in English (16 pages).
EPO; Communication Pursuant to Article 94(3) EPC issued in EP Application No. 20902740.8 dated Feb. 19, 2025 in English (7 pages).
CN: Search Report issued in CN Application No. 202080088392.5 dated Sep. 5, 2023, English translation (4 pages).
CN: First Office Action issued in CN Application No. 202080088392.5 dated Sep. 5, 2023, English translation (6 pages).
EPO; Application No. 20902740.8; Communication Pursuant to Article 94(3) EPC in English, dated Jul. 23, 2025 (8 pages).

* cited by examiner

JOINING SYSTEM FOR FURNITURE

CROSS-REFERENCE TO RELATED APPLICATIONS

This application is a U.S. national phase application of International Application No. PCT/SE2020/051192, filed Dec. 10, 2020, designating the United States, which claims priority to Swedish Application No. 1951500-6, filed Dec. 18, 2019.

TECHNICAL FIELD

The invention relates to a joining system for furniture.

BACKGROUND

It has long been a trend to buy furniture for self-assembly, known as Ready-to-assemble furniture. The most prominent advantage of Ready-to-assemble furniture is that shipping and handling is cheaper, easier and more environmentally friendly. To further increase the benefits of Ready-to-assemble furniture, a lot of effort is put into solutions facilitating the assembly. Traditionally, assembly has been based on the use of screws, nails and glue. These traditional assembly methods have drawbacks in that they are time consuming and often require a certain level of skill of the person assembling the furniture. Traditional assembly methods usually create opportunities for errors and are based on loose items which could be misplaced or be missing at the outset.

One trend in Ready-to-assemble furniture is to replace the traditional assembly methods with assembly methods based on snap-lock mechanical locking technologies. Snap-lock technologies are often based on recesses, protrusions and elastic elements. A major challenge in manufacturing and assembly of snap-lock Ready-to-assemble furniture is that the quality of various furniture elements is never perfect and there is always a variation in the dimensions. The accepted variations are known as engineering tolerance and is something that needs to be considered for every element included in an assembled product. This consideration becomes increasingly more complex the more elements that needs to be assembled to form a finished product.

Finding solutions that makes it easy to take into account the engineering tolerances is therefore of great importance.

SUMMARY

It is an object to mitigate, alleviate or eliminate one or more of the above-identified deficiencies in the art.

It should be noted that elements from the described embodiments can be used in combination as long as this is not clearly contradictory. The description of the elements in connection with different embodiments should be seen as a way of facilitating the understanding and not as limiting to the ways the elements can be combined.

According to one embodiment, a joining system for furniture is provided. The joining system comprises a first furniture element, a second furniture element and a joining element. The joining element has a first and second surface on substantially opposite sides of the joining element. The first furniture element is connected to the second furniture element for forming a furniture portion. The first furniture element comprises a female coupling recess for receiving the joining element and the second furniture element comprises a connection portion for connecting the second furniture element to the joining element. The joining element comprises a male coupling portion for connecting the joining element to the female coupling recess and a connection portion for connecting the joining element to the second furniture element. The female coupling recess comprises a first and second stabilizing portion, and a protrusion protruding from a surface comprising the second stabilizing portion. The male coupling portion comprises a first engaging portion formed in the first surface and configured to engage the first stabilizing portion of the female coupling recess, and a second engaging portion formed in the second surface and configured to engage the second stabilizing portion of the female coupling recess. The male coupling portion further comprises a recess formed in the second surface and configured to receive the protrusion of the female coupling recess. The joining element has a width between the first and second surfaces in the area of the second engaging portion. An increase in the width causes the first engaging portion to press harder on the first stabilizing portion which causes the male coupling portion to bend to compensate for the increased width. As such, the joining system can absorb the differences in the dimensions of the furniture material and as such accept lower engineering tolerance making the joining system less sensitive for quality variations.

According to one embodiment of the joining system, the female coupling recess comprises a slanted entry surface which is formed in the surface of the female coupling recess comprising the first stabilizing portion. The slanted entry surface facilitates the insertion of the joining portion in the recess.

According to one embodiment of the joining system, the male coupling portion comprises a chamfered portion formed in the second surface of the male coupling portion, wherein the chamfered portion is chamfered to compensate for the bend of the male coupling portion.

According to one embodiment, the joining system further comprising a gap between the chamfered portion of the male coupling portion and a lower recess surface being a portion of the surface comprising the protrusion, and the second stabilizing portion of the female coupling recess. The gap enables the bend in the male coupling portion.

According to one embodiment of the joining system, the male coupling portion comprises an end portion configured to be placed furthermost into the female coupling recess. A width of the joining element in the area of the end portion is smaller than the width of the joining element in the area of the second engaging portion. As such, the end portion is tapered which facilitates the insertion into the female coupling recess.

According to one embodiment, the connection portion of the second furniture element comprises a recess configured for receiving a portion of the joining element and according to one embodiment the recess is a groove configured to receive a portion of one side of the joining element.

According to one embodiment, the joining system further comprises a gap between a bottom recess surface of the female coupling recess and the end portion of the male coupling portion. The gap enables the male coupling portion to be inserted into the female coupling recess even if there is dust or small debris in the female coupling recess.

According to one embodiment, the first engaging portion is chamfered to facilitate insertion into the female coupling recess.

According to one embodiment, the connection portion of the second furniture element comprises a second female coupling recess comprising a first stabilizing portion, a second stabilizing portion, and a protrusion protruding from a surface comprising the second stabilizing portion. The joining element may further comprise a second male coupling portion comprising a first engaging portion formed in the first surface and configured to engage the first stabilizing portion of the second female coupling recess, and a second engaging portion formed in the second surface and configured to engage the second stabilizing portion of the second female coupling recess. The joining element further comprises a recess formed in the second surface and configured to receive the protrusion of the second female coupling recess.

A furniture portion is further provided. The furniture portion comprises a first furniture element according to any one of the furniture elements herein, a second furniture element according to any one of the furniture elements herein, and a joining element according to any one of the preceding claims.

A method of manufacturing a furniture portion is further provided. The furniture portion may be the joining element according to any of the embodiments herein. The method comprises the steps of: placing a piece of furniture material on a milling table with a first surface of the furniture material facing the milling table, chamfering a first edge of the first surface of the furniture material, while the first surface of the furniture material is facing the milling table, chamfering a second edge on a second surface of the furniture material, such that a double chamfered edge is created, and milling a groove adjacent to the second edge, the groove extending in the direction of the length axis of the double chamfered edge.

In one embodiment, the step of milling the groove in the second surface of the furniture material is performed with a milling tool having a most distal engaging portion having a first angle, and wherein the position of the most distal engaging portion varies with the width of the furniture material while the first angle at the most distal engaging portion remains constant.

According to the one embodiment of the method, the step of chamfering the second edge and milling the groove is performed in a single operation.

The elements from the different embodiments discloses above may be combined an any way unless clearly contradictory.

BRIEF DESCRIPTIONS OF THE DRAWINGS

The invention will by way of example be described in more detail with reference to the appended schematic drawings, on which:

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness.

Additionally, variations of the disclosed embodiments can be understood and effected by the skilled person in practicing the claimed invention, from a study of the drawings, the disclosure, and the appended claims.

The furniture elements mentioned herein could for example be furniture elements made from for example wood or a wood-based material such as MDF or HDF, SPC (Stone Plastic Composite), plastic or composite polymer materials like PVC or LVT or other polymer materials or metals such as aluminium.

Figure 1A:
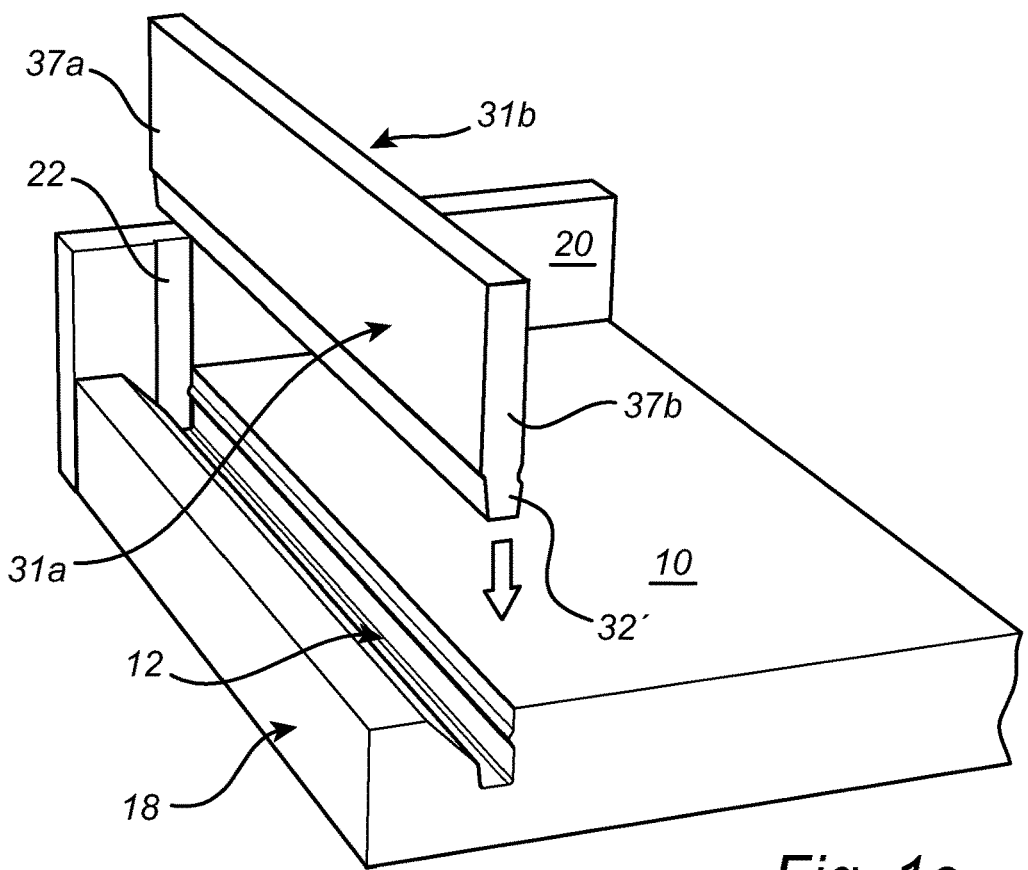
FIG. 1a shows an elevated perspective view of a joining system according to a first embodiment, in a state in which the furniture portions are being joined.

FIG. 1a shows an elevated perspective view of a joining system for furniture according to a first embodiment. The joining system comprises a first furniture element 10, a second furniture element 20 and a joining element 30. The first furniture element 10 is connected to the second furniture element 20 for forming a furniture portion, and FIG. 1a illustrated the state in which the joining element 30 is connected to the first and second furniture elements 10,20. The first and second furniture elements 10,20 may be connected by means of snap-locking elements or by means of conventional fastening elements such as screws. The furniture could for example be a chest of drawers, a washstand, a bookcase or any other piece of furniture having at least one connected corner. The first furniture element 10 comprises a female coupling recess 12 for receiving the joining element 30. In the embodiment of FIG. 1a, the female coupling recess 12 is a milled groove 12 extending the entire width of the first furniture element 10 close to the rear edge surface 18 of the first furniture element 10. The second furniture element 20 comprises a connection portion 22 for connecting to the joining element 30. The connection portion 22 is also a milled groove 22 aligned with the milled groove 12 of the first furniture element such that the joining element 30 can be placed in the two milled grooves simultaneously. In the embodiment shown in FIG. 1a, the milled groove 22 in the second furniture element 20 is straight groove with a rectangular cross section. The groove 22 is somewhat wider than the thickness of the edge surface 37a of the joining element 30, such that the edge surface 37a of the joining element can be inserted or slid into the groove 22.

The joining element comprises a first male coupling portion 32' being a double chamfered edge portion 32' extending along the full length of the joining element 30 such that the full length of the joining element 30 can be inserted into the female coupling recess 12. The first male coupling portion 32' and the female coupling recess 12 together forms a snap-lock which connects and locks the joining element 30 to the first furniture element 10.

Figure 1B:
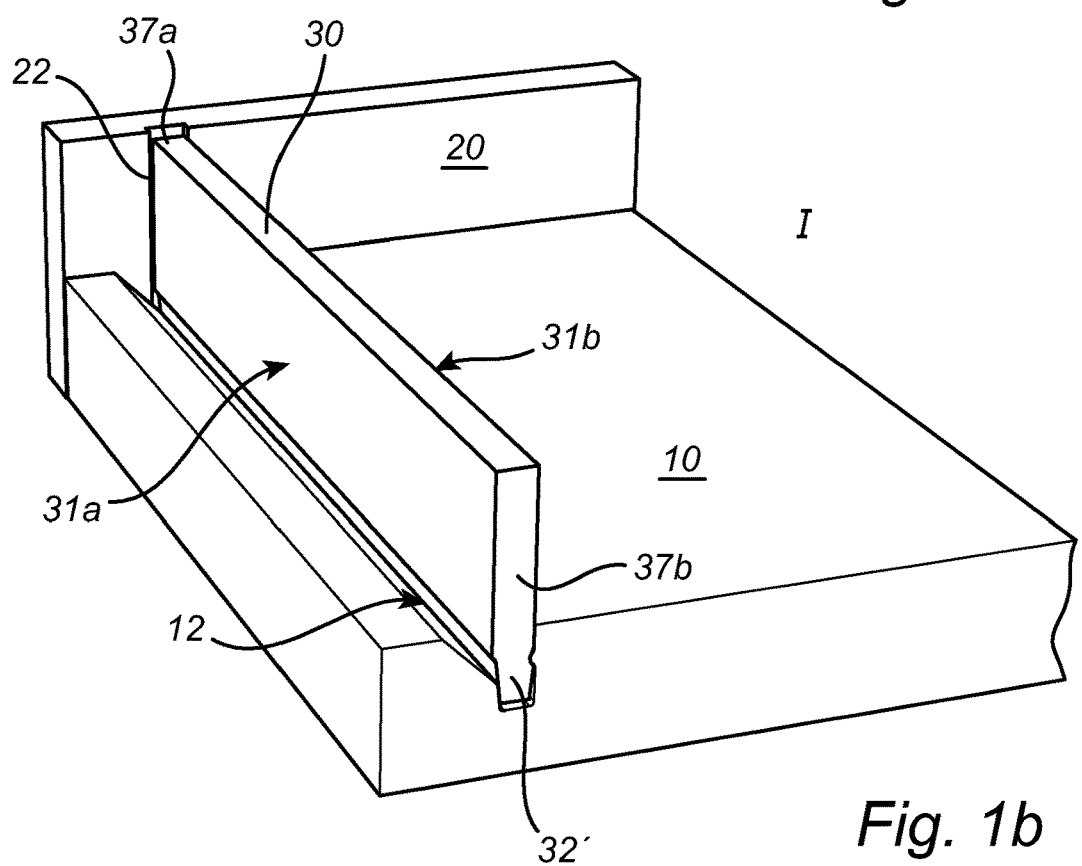
FIG. 1b shows an elevated perspective view of the joining system according to the first embodiment, in a state in which the furniture portions have been joined.

FIG. 1b shows the joining system according to the embodiment shown in FIG. 1a, in the state in which the joining element 30 has been fully inserted into the female coupling recess 12 of the first furniture element 10 and engaged in the groove 22 of the second furniture element 20. In this state, a corner of the furniture is connected such that a closed inside corner is formed in view from the inside I of the piece of furniture.

Figure 2A:
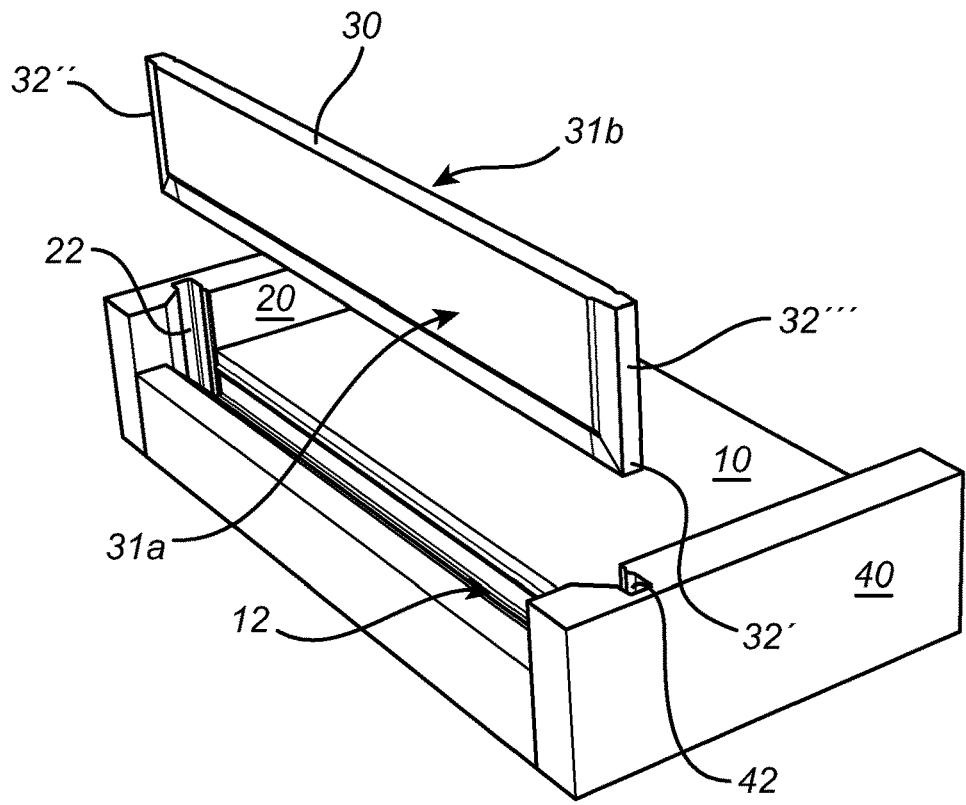
FIG. 2a shows an elevated perspective view of a joining system according to a second embodiment, in a state in which the furniture portions are being joined.

FIG. 2a shows an elevated perspective view of a joining system for furniture according to a second embodiment. The embodiment of FIG. 2a differs from the embodiment of FIGS. 1a and 1b in that the milled groove 22 in the second furniture element 20 is a female coupling recess 22 having a cross section being identical to the female coupling recess 12 of the first furniture element 10. Correspondingly, the joining element 30 comprises a second male coupling portion 32" perpendicular to the first male coupling portion 32' of the first furniture element 10. The second male coupling portion 32" has a cross section which is identical to the cross section of the first male coupling portion 32'.

As the second furniture element 20 is provided with a female coupling recess 22 and the joining element 30 is provided with a second male coupling portion 32", the female coupling recess 22 and the second male coupling 32" together forms a snap-lock which connects and locks the joining element 30 to the second furniture element 20. As such, the connection of the joining element 30 to the first and second furniture elements 10,20 assists the connection between the first and second furniture elements 10,20.

The embodiment shown in FIG. 2a further differs in that that the furniture further comprises a third furniture element 40, such that a furniture portion having two sides 20,40 one bottom 10 and one back 30 is formed. Such a furniture portion could for example be used to form a chest of drawers, a wash-stand or bookcase. In the embodiment shown in FIG. 2a, the third furniture element 40 is the mirror image of the second furniture element 20 and comprises a milled groove 42 which is a female coupling recess 42 having a cross section being identical to the female coupling recess 12 of the first furniture element and the female coupling recess 22 of the second furniture element 20 of the second embodiment. It is also conceivable that the furniture is composed such that the joining element 30 forms the bottom of for example a drawer and the first furniture element 10 forms the front of the drawer. It is also conceivable that the furniture is composed such that the joining element 30 forms the bottom or top of for example a bookcase and the first furniture element 10 forms the back of the bookcase.

As the third furniture element 40 is provided with a female coupling recess 42 and the joining element 30 is provided with a third male coupling portion 32''', the female coupling recess 22 and the third male coupling portion 32''' together forms a snap-lock which connects and locks the joining element 30 to the second and third furniture elements 20,40. As such, the connection of the joining element 30 to the first, second and third furniture elements 10,20,40 assists the connection between the first, second and third furniture elements.

Figure 2B:
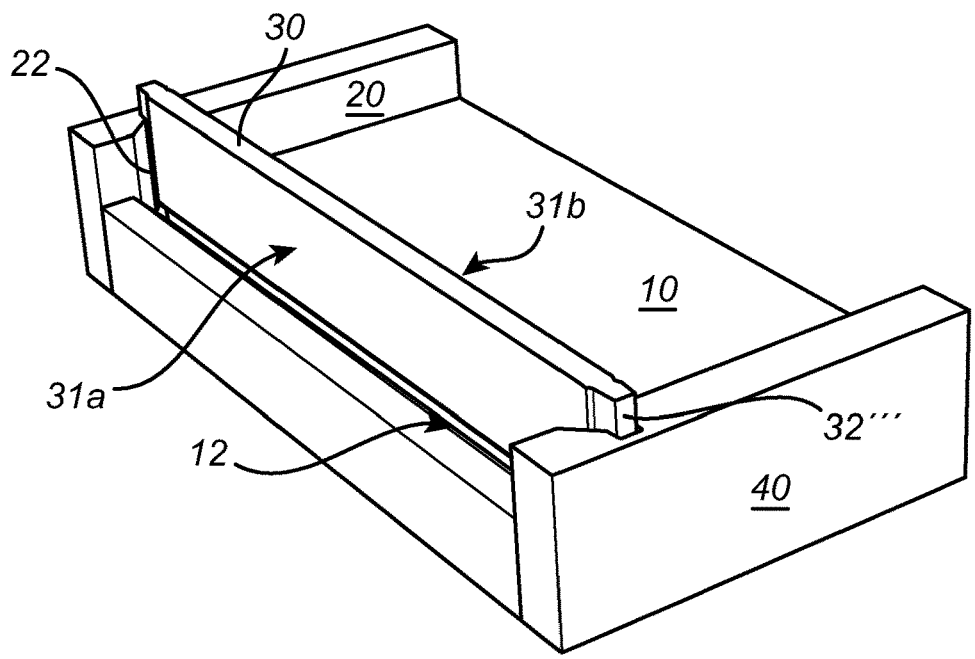
FIG. 2b shows an elevated perspective view of the joining system according to the second embodiment, in a state in which the furniture portions have been joined.

FIG. 2b shows the joining system according to the embodiment shown in FIG. 2a, in the state in which the joining element 30 has been fully inserted into the female coupling recesses 12,22,42 of the first, second and third furniture elements 10,20,40. In this state, two sides 20,40 one bottom 10 and one back 30 is connected such that four sides of a cuboid are closed. Such as furniture portion is for example commonly forms the bottom portion of a bookcase, or the upper portion of a bookcase if the furniture portion is turned upside down.

Figure 3:
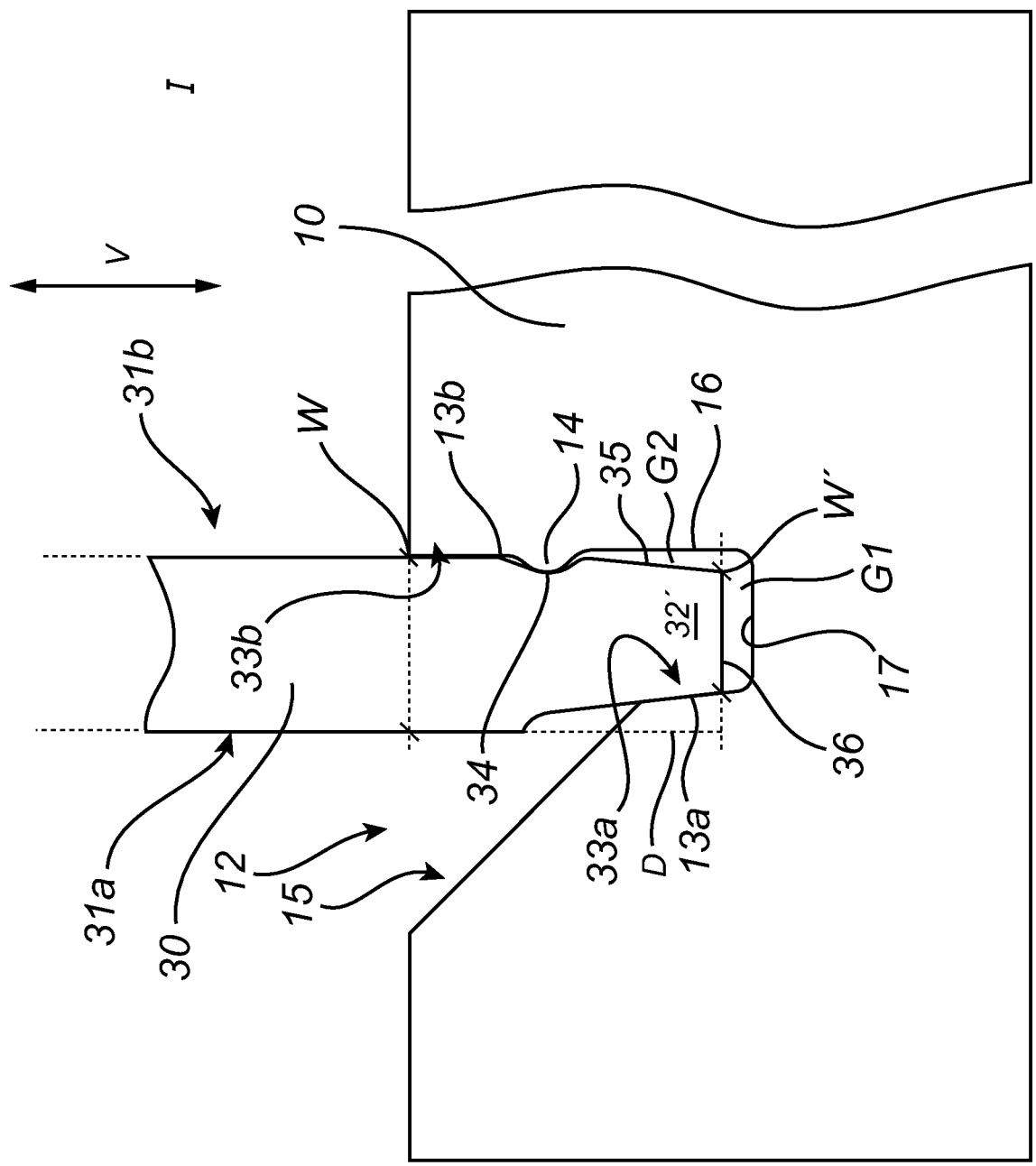
FIG. 3 shows a side view of the joining system when the joining element has been positioned in the recess of the first furniture element.

FIG. 3 shows a cross-sectional view of the first furniture element 10 and the joining element 30 of the first and second embodiments. The first furniture element 10 comprises a female coupling recess 12 which in the embodiment shown in FIG. 3 is a milled groove 12, for receiving the joining element 30. The female coupling recess 12 comprises a first stabilizing portion 13a, which in the embodiment of FIG. 3 is a first surface of the inside of the milled groove 12. The female coupling recess 12 further comprises a second stabilizing portion 13b, which in the embodiment of FIG. 3 is a second surface of the inside of the milled groove 12 and a protrusion 14 protruding from the surface comprising the second stabilizing portion 13b.

The joining element 30 has a first 31a and second 31b surface on substantially opposite sides of the piece of material forming the joining element 30. The joining element 30 comprises a male coupling portion 32', being a double chamfered edge portion 32', for connecting the joining element 30 to the female coupling recess 12. The male coupling portion 32' comprises a first engaging portion 33a, formed as a chamfered first edge 33a of the first surface 31a and configured to engage the first stabilizing portion 13a of the female coupling recess 12. The male coupling portion 32' further comprises a second engaging portion 33b formed as a chamfered second edge 33b of the second surface 31b and configured to engage the second stabilizing portion 13b of the female coupling recess 12. The male coupling portion 32' further comprises a recess 34 formed in the second surface 31b and configured to receive the protrusion 14 of the female coupling recess 12 for creating a lock in the vertical direction V by means of the lower portion of the recess 34 in the male coupling portion 32' engaging the lower portion of the protrusion 14 (as is further shown in FIGS. 4 and 5). In the embodiment shown in FIG. 3, the protrusion 14 is a rounded, semi-circularly shaped protrusion 14. However, in alternative embodiments, the protrusion may be a protrusion having at least one sharp edge and/or straight surface, such as for example a triangular shape. In embodiments in which the protrusion has at least one sharp edge and/or straight surface, the recess in the male coupling portion 32' may have a corresponding sharp edge and/or straight surface for engaging with the protrusion.

In the embodiment shown in FIG. 3, the first and second edges 33a,33b are both chamfered. However, in alternative embodiments it is equally conceivable that the first and second edges 33a,33b are straight, i.e. have surfaces that are parallel to the first and second surfaces 31a,31b respectively. Such straight parallel surfaces may be milled recesses or may be straight surfaces that are extensions of the first and second surfaces 31a,31b.

The quality of the furniture elements is never perfect and there is always a variation in the dimensions, irrespective of which material the furniture elements are made from. If portions of material having these varying dimensions should be possible to use in snap-lock connections, these variations need to be possible to absorb. In the embodiment shown in FIG. 3, the joining element 30 has a width W between the first 31a and second 31b surfaces in the area of the second engaging portion 33b. As the thickness of joining element 30 varies due to imperfect quality, this may cause an increase in the width W. This increase in the width W causes the first engaging portion 33a to press harder on the first stabilizing portion 13a which causes the male coupling portion 32' to bend in a direction towards the surface comprising the second stabilizing portion 13b to compensate for the increased width W. With this bending in a C-shape, the increased width is absorbed with the second engaging portion 33b being constantly connected to, and pressed tightly against, the second stabilizing portion 13b. This tight abutment creates a near perfect joint between the first furniture element 10 and the joining element 30 when viewed from inside I of the furniture element. The tight abutment eliminates the formation of shadows and the reduces the risk that dust and debris will assemble in the joint between the first furniture element 10 and the joining element 30.

In the embodiment shown in FIG. 3, the female coupling recess 12 further comprises a slanted entry surface 15 surface formed in the surface of the female coupling recess 12 which comprises the first stabilizing portion 13a. The slanted entry surface 15 surface facilitates insertion of the male coupling portion 32' of the joining element 30 into the female coupling recess 12.

In the embodiment shown in FIG. 3, the male coupling portion 32' is double chamfered. The chamfered portion 35 formed on the second surface 31b of the male coupling portion 32' is chamfered both to facilitates insertion of the male coupling portion 32' of the joining element into the female coupling recess 12 and to compensate for the C-shaped bend of the male coupling portion 32', which is further seen in FIGS. 4 and 5. The chamfered portion 35 creates a gap G2 between the chamfered portion 35 of the male coupling portion 32' and a lower recess surface 16 (which is a portion of the surface comprising the protrusion 14 and the second stabilizing portion 13b). The width of the gap G2 varies with the bending of the male coupling portion 32', and as such varies with the varying width W of the joining element 30. In the embodiment shown in FIG. 3, the gap G2 at the widest place is in the range 5%-15% of the width W.

In the embodiment shown in FIG. 3, the male coupling portion 32' further comprises an end portion 36 configured to be placed furthermost into the female coupling recess 12. A width W' of the joining element 30 in the area of the end portion 36 is smaller than the width W of the joining element 30 in the area of the second engaging portion 33b. In the embodiment shown in FIG. 3, the width W' is less than 80% of the width W, however, in alternative embodiments, it equally conceivable that the width W' is less than 90% of the width W or less than 70% of the width W for facilitated insertion and for creating the ability of absorbing differences in the width W.

The male coupling portion 32' extends a distance D into the female coupling recess 12. In the embodiment shown in FIG. 3, the distance D is smaller than the width W for creating a more stable fixation of the joining element 30 in the first furniture element 10. In the embodiment shown in FIG. 3, there is a gap G1 between a bottom recess surface 17 of the female coupling recess 12 and the end portion 36 of the male coupling portion 32', such that the male coupling portion can be inserted the entire distance D into the female coupling recess even if there is dust or small debris in the female coupling recess. In the embodiment shown in FIG. 3, the gap G1 is in the range 5%-15% of the width W.

In the description above of the embodiment shown in FIG. 3, the description is made in relation to the female coupling recess of the first furniture element, and the first male coupling recess formed as a double chamfered edge of the joining element. However, the female coupling recesses (22,42) and the second and third male coupling recess (32",32") described under reference to FIGS. 2a and 2b have identical cross sections and as such the description made under reference to FIG. 3 is equally applicable to the connections between the joining element and the second and third furniture elements.

Figure 4:
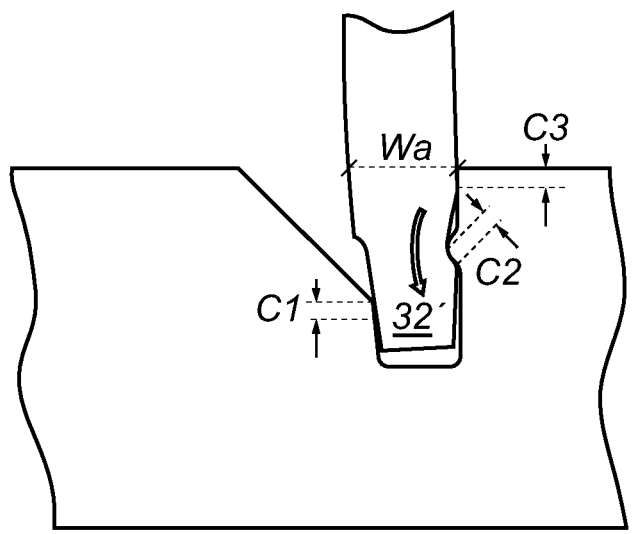
FIG. 4 shows an embodiment of the joining system in a side view in which the joining element has a width Wa.
Figure 5:
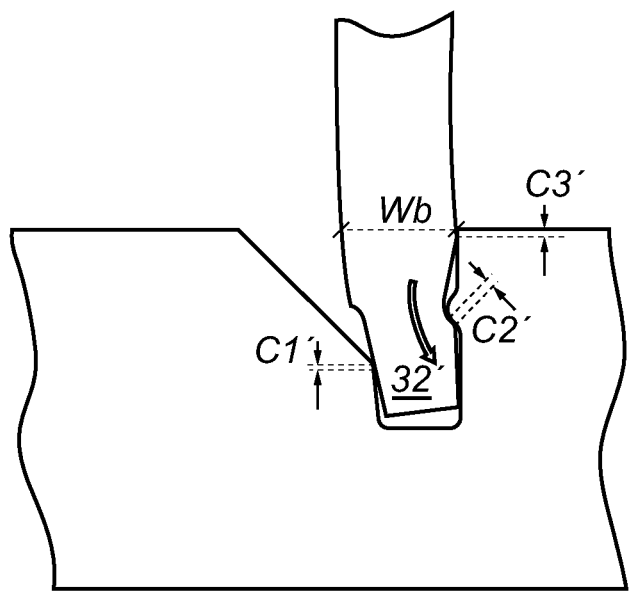
FIG. 5 shows an embodiment of the joining system in a side view in which the joining element has a width Wb.

FIG. 4 shows the joining system as described with reference to FIGS. 1a-3 in an embodiment in which the width Wa is index 100. In this embodiment, the male coupling portion 32' connects to the first stabilizing portion (13a of FIG. 3) along a surface C1, connects to the protrusion (14 of FIG. 3) along a surface C2, and connects to the second stabilizing portion (13b of FIG. 3) along a surface C3. In the embodiment shown in FIG. 5 the width Wb is index 105, i.e. 5% larger than Wa causing the male coupling portion to bend more in the C-shape to compensate for the increased width. As a result, the male coupling portion 32' connects to the first stabilizing portion along a surface Cr, being smaller than C1, connects to the protrusion along a surface C2', being smaller than C2, and connects to the second stabilizing portion along a surface C3', being smaller than C3. What can be seen is that even as the male coupling portion 32' bends more, the second surface (31b in FIG. 3) still abuts the second stabilizing portion such that a tight connection is created.

A method of manufacturing the joining element in a milling machine is further provided. The method comprises placing a piece of furniture material on a milling table with a first surface (31a of FIGS. 1a-3) of the furniture material facing the milling table. The furniture material could for example be solid wood, laminated wood, different types of fibreboard materials like MDF or HDF materials, plastic or composite polymer materials like PVC or LVT or other polymer materials and metals such as aluminium.

Figure 6:
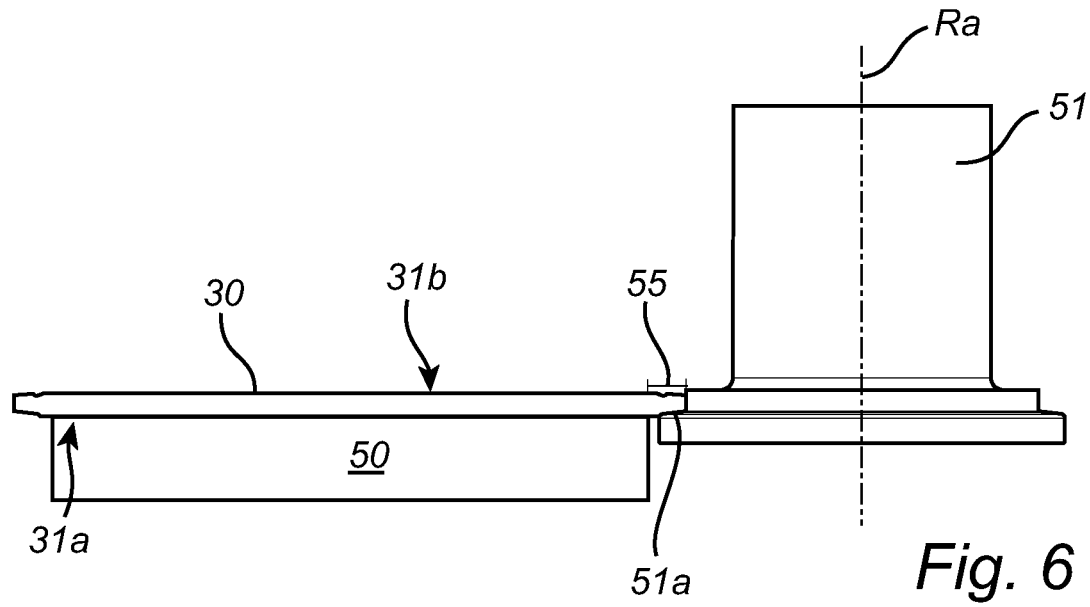
FIG. 6 shows the joining element in a side view when a milling operation is being performed.

FIG. 6 shows the joining element 30 (according to any of the embodiments shown in FIGS. 1a-3) when placed on a milling table 50. The joining element 30 is placed on the milling table 50 such that the joining element 30 protrudes outside of the milling table 50 a distance 55, such that the milling tool 51 can engage the edge of the first surface 31a with the engaging portion 51a of the milling tool 51 and chamfer a first edge 33a of the first surface 31a of the furniture material, while the first surface 31a of the furniture material is facing the milling table 50. Preferably, this step is performed with a milling tool 50 approaching the joining element 30 and the milling table 50 from the side thereof and thus makes a milling operation in the direction towards the centre of the joining element 30. In the embodiment shown in FIG. 6, the milling tool 51 is a milling tool having a rotational axis Ra perpendicular to the first and second surface 31a,31b of the joining element 30.

Figure 7:
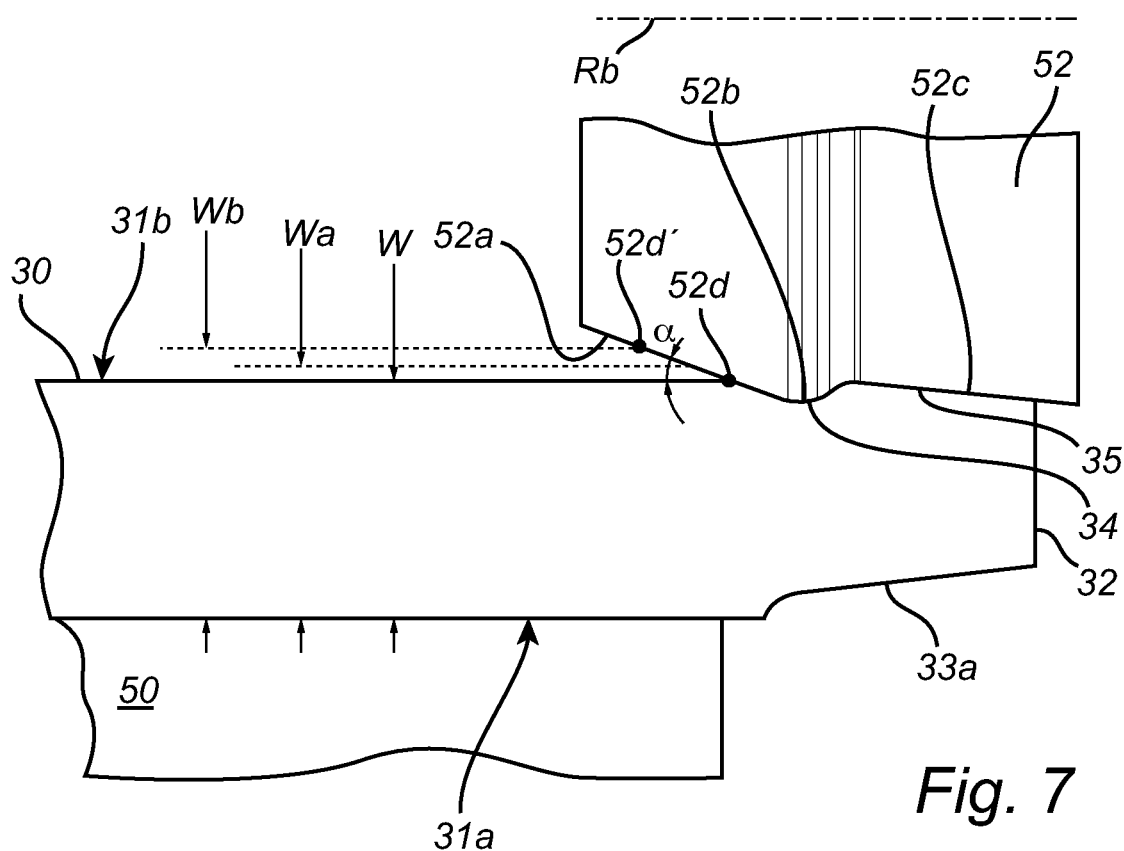
FIG. 7 shows the joining element in an enlarged side view when a milling operation is being performed.

FIG. 7 shows the step of chamfering a second edge 35 on the second surface 31b of the joining element 30 with a third engaging portion 52c, such that a double chamfered edge is created tapering in the direction away from the centre of the furniture material 30. FIG. 7 further shown the simultaneous milling of the groove 34, adjacent to the second edge 35, by means of a second engaging portion 52b of the same milling tool 52. The milling tool 52 is a milling tool having a rotational axis Rb parallel to the first and second surface 31a,31b of the joining element 30. The groove 34 extends in the direction of the length axis of the double chamfered edge and step of chamfering the second edge 35 and milling the groove 34 is in the embodiment shown in FIG. 7 performed in a single operation using a milling tool 52 designed to both chamfer and mill a groove 34. However, in alternative embodiments, it is equally conceivable that chamfering the second edge 35 and milling the groove is performed in two separate operations.

The milling tool 52 has a first engaging portion 52a which is slanted at a first angle α a distance which extends further than the material of the joining element 30 to be milled. This is to make sure that the machined portion of the joining element 30 will have the same first angle α irrespectively of the width W,Wa,Wb of the furniture material of the joining element 30. In the embodiment shown in FIG. 7, the furniture material of the joining element 30 has a width W. However, as shown in FIG. 7, the material may have a width which is Wa or Wb, e.g. more than 1% wider than W and more than 2% wider than W, respectively. In an alternative embodiment, the material may have a width which is Wa or Wb, e.g. more than 3% wider than W and more than 6% wider than W, respectively. As the first angle α of the engaging portion 52a is the same at the point where the milling tool 52 engages the material which is closest to the centre of the joining element 30 (the most distal engaging portion 52d,52d') the machined portion of the joining element has the same first angle α (at least at the most distal engaging portion 52d,52d') irrespectively of the width W,Wa,Wb (thickness) of the furniture material.

As the first surface 31a of the joining element is always facing the milling table 50, the machined surfaces (first and second chamfered edges 33a,35 and the groove 34) is always positioned correctly in relation to the first surface 31a (with the accuracy of the milling machine). The variations in the thickness of the furniture material will thus not affect the machined surfaces relation to the first surface 31a.

The joining system and the furniture portions presented herein is equally conceivable in a wide variety of materials, such as for example solid wood, laminated wood, different types of fibreboard materials like MDF or HDF materials, plastic or composite polymer materials like PVC or LVT or other polymer materials and metals such as aluminium. The joining system may also be used for joining hollow profile beams in plastic, steel or aluminium.

The invention claimed is:

1. A joining system for furniture, the joining system comprising:
   a first furniture element,
   a second furniture element and
   a joining element having a first surface and a second surface on substantially opposite sides of the joining element, wherein the first furniture element is connected to the second furniture element for forming a furniture portion and wherein:
      the first furniture element comprises a female coupling recess for receiving the joining element,
      the second furniture element comprises a connection portion for connecting the second furniture element to the joining element, and
      the joining element comprises a male coupling portion for connecting the joining element to the female coupling recess and a connection portion for connecting the joining element to the second furniture element, wherein:
the female coupling recess comprises:
   a first stabilizing portion,
   a second stabilizing portion, and
   a protrusion protruding from a surface comprising the second stabilizing portion, and wherein the male coupling portion comprises:
   a first engaging portion formed in the first surface and configured to engage the first stabilizing portion of the female coupling recess,
   a second engaging portion formed in the second surface and configured to engage the second stabilizing portion of the female coupling recess, and
   a recess formed in the second surface and configured to receive the protrusion of the female coupling recess, wherein the second engaging portion is positioned further from an end portion of the male coupling portion than the recess, and wherein
   the joining element has a width between the first and second surfaces in an area of the second engaging portion, and wherein an increase in the width causes the first engaging portion to press harder on the first stabilizing portion, when the male coupling portion is inserted into the female coupling recess, which causes the male coupling portion to bend in a direction away from the first stabilizing portion to compensate for the increased width.

2. The joining system according to claim 1, wherein the female coupling recess comprises a slanted entry surface formed on a side of the female coupling recess comprising the first stabilizing portion.

3. The joining system according to claim 1, wherein the male coupling portion comprises a chamfered portion formed in the second surface of the male coupling portion, and wherein the chamfered portion is chamfered to compensate for the bend of the male coupling portion.

4. The joining system according to claim 3, further comprising a gap between the chamfered portion of the male coupling portion and a lower recess surface being a portion of the surface comprising the protrusion and the second stabilizing portion of the female coupling recess.

5. A method of manufacturing the joining element according to claim 3 comprising the steps of:
   placing a piece of furniture material on a milling table with a first surface of the furniture material facing the milling table,
   chamfering a first edge of the first surface of the furniture material, while the first surface of the furniture material is facing the milling table,
   chamfering a second edge on a second surface of the furniture material, such that a double chamfered edge is created, and
   milling a groove adjacent to the second edge, the groove extending in the direction of a length axis of the double chamfered edge.

6. The method according to claim 5, wherein the step of chamfering the second edge and milling the groove is performed in a single operation.

7. The method according to claim 5, in which the step of chamfering the first edge of the first surface of the furniture material is performed with a milling tool having a rotational axis which is perpendicular to the first surface of the joining element.

8. The method according to claim 5, in which the step of chamfering the second edge of the second surface of the furniture material and/or milling the groove in the second surface of the furniture material is performed with a milling tool having a rotational axis which is parallel to the first surface of the joining element.

9. The method according to claim 5, in which the step of milling the groove in the second surface of the furniture material is performed with a milling tool having an engaging portion having a first angle, and wherein the engaging portion extends over a portion of the milling tool such that the engaging portion can engage furniture material of varying width with the same first angle.

10. The method according to claim 5, in which the step of milling the groove in the second surface of the furniture material is performed with a milling tool having a most distal engaging portion having a first angle, and wherein the position of the most distal engaging portion varies with the width of the furniture material while the first angle at the most distal engaging portion remains constant.

11. The joining system according to claim 1, wherein the end portion of the male coupling portion is configured to be placed furthermost into the female coupling recess, wherein a width of the joining element in an area of the end portion is smaller than the width of the joining element in the area of the second engaging portion.

12. The joining system according to claim 1, wherein the connection portion of the second furniture element comprises a recess configured for receiving a portion of the joining element.

13. The joining system according to claim 12, wherein the recess is a groove configured to receive a portion of one side of the joining element.

14. The joining system according to claim 1, further comprising a gap between a bottom recess surface of the female coupling recess and the end portion of the male coupling portion.

15. The joining system according to claim 1, wherein the first engaging portion is chamfered.

16. The joining system according to claim 1, wherein the connection portion of the second furniture element comprises a second female coupling recess comprising:
   a first stabilizing portion,
   a second stabilizing portion, and
   a protrusion protruding from a surface comprising the second stabilizing portion,
   and wherein joining element further comprises a second male coupling portion comprising:
   a first engaging portion formed in the first surface and configured to engage the first stabilizing portion of the second female coupling recess,
   a second engaging portion formed in the second surface and configured to engage the second stabilizing portion of the second female coupling recess, and
   a recess formed in the second surface and configured to receive the protrusion of the second female coupling recess.

17. A furniture portion comprising the joining system according to claim 1.

* * * * *